March 23, 1971  W. E. BRANDAU  3,572,127
FRICTION FREE FORCE VECTOR PRESSURE RATIO SENSOR
Filed May 27, 1969  2 Sheets-Sheet 2

INVENTOR.
WILLIAM E. BRANDAU
BY
ATTORNEY

United States Patent Office 3,572,127
Patented Mar. 23, 1971

3,572,127
FRICTION FREE FORCE VECTOR PRESSURE RATIO SENSOR
William E. Brandau, Westwood, N.J., assignor to The Bendix Corporation
Filed May 27, 1969, Ser. No. 828,267
Int. Cl. G01l 7/06
U.S. Cl. 73—407    7 Claims

ABSTRACT OF THE DISCLOSURE

A force vector pressure ratio sensor has a carriage adapted to pivot about a first axis and has a pulley rotatably mounted on the carriage. A second pulley is connected to the first pulley by a non-slip belt and has a movable axis normally coincident with the first axis. A change of pressure ratio causes the second pulley to be displaced about the first pulley and a pair of sensors detect the displacement and provide signals corresponding thereto. A servo is responsive to the sensor signals for causing the carriage to pivot about the first axis until the axis of the second pulley is coincident with the first axis and the angular position of the carriage corresponds to the pressure ratio. Friction free displacement of the second pulley is provided by extensive use of flex pivots in combination with the belt and pulley arrangement. A linkage assembly programs the rotation of the first pulley relative to the carriage thereby eliminating any errors in the carriage position caused by friction between the first pulley and the carriage. The angular position of the carriage, which is free of frictional errors, corresponds to the ratio of the pressures.

BACKGROUND OF THE INVENTION

Field of the invention

This invention relates to a force vector pressure ratio sensing device and more particularly to such a device that is free from the effects of friction.

Description of the prior art

Heretofore, the accuracy and sensitivity of force vector pressure ratio sensors were downgraded by the effects of bearing friction which were aggravated by high loading factors on the bearings. The sensitivity was particularly downgraded at high altitudes and high airspeeds where displacements caused by altitude changes were very small and unrepeatable because of the frictional effects. The small displacements were also difficult to detect because of reduced sensor sensitivity at an extreme end of its usable range.

SUMMARY OF THE INVENTION

The present invention contemplates a force vector pressure ratio sensing device that is free from the effects of friction for measuring the ratio of a first pressure to the difference between the first pressure and a second pressure. A reaction member including a belt and two pulleys has a first pulley rotatably mounted on a carriage that is adapted to pivot about a first axis and a second pulley having a movable axis that is normally coincident with the first axis. A first force corresponding to the first pressure and a second force corresponding to the difference between the first and second pressures are applied to the second pulley through a pair of flexible connecting links causing the second pulley to be displaced about the first pulley so that the reaction member is aligned with a resultant of the applied forces. Two sensors sense the displacement of the second pulley and provide signals to a servo that is responsive thereto for causing the carriage to pivot until the axis of the second pulley is coincident with the first axis. When the axis of the second pulley is coincident with the first axis the angular position of the carriage corresponds to the ratio of the two forces.

The device maintains sensitivity throughout the entire range by using two displacement sensors placed at right angles to each other to sense components of the displacement of the second pulley in the direction of each connecting link. When the resultant force nears alignment with a connecting link the associated sensor loses sensitivity because the sensed component of displacement becomes insignificant for an incremental change in pressure ratio; however, the component of displacement in the direction of the other connecting link is increased at this position resulting in enhanced sensitivity of the associated sensor. The outputs of both sensors are added resulting in substantially constant sensitivity throughout the pressure ratio range.

Flex pivots are used for all pivotal connections between the second pulley, the connecting links and the displacement sensors. Flex pivots are friction free and thus do not contribute to sensor inaccuracies; however, they have restricted rotational limits and therefore may not be used as part of the reaction member which must rotate beyond the limits of flex pivots. The reaction member used in the present invention is essentially friction free because of its unique pulley and belt arrangement. Displacement of the second pulley is unimpeded by friction from either the flex pivots or the reaction member and there is no loss of sensitivity caused by friction.

Frictional errors caused by the friction between the first pulley and the carriage are eliminated by programming the rotation of the first pulley relative to the carriage with a linkage arrangement that causes the servo to absorb the frictional forces. The position of the carriage is uneffected by friction and no loss of accuracy is experienced.

One object of the invention is to provide a force vector ratio sensing device that is free of frictional errors.

Another object of the invention is to provide a force vector ratio sensor that maintains accuracy and sensitivity over its entire range.

Another object of the invention is to provide a force vector ratio sensor using flex pivots in place of bearings having high loading factors.

The foregoing and other objects and advantages of the invention will appear more fully hereinafter from a consideration of the detailed description which follows, taken together with the accompanying drawing wherein one embodiment of the invention is illustrated by way of example.

DESCRIPTION OF THE INVENTION

Figure 1:
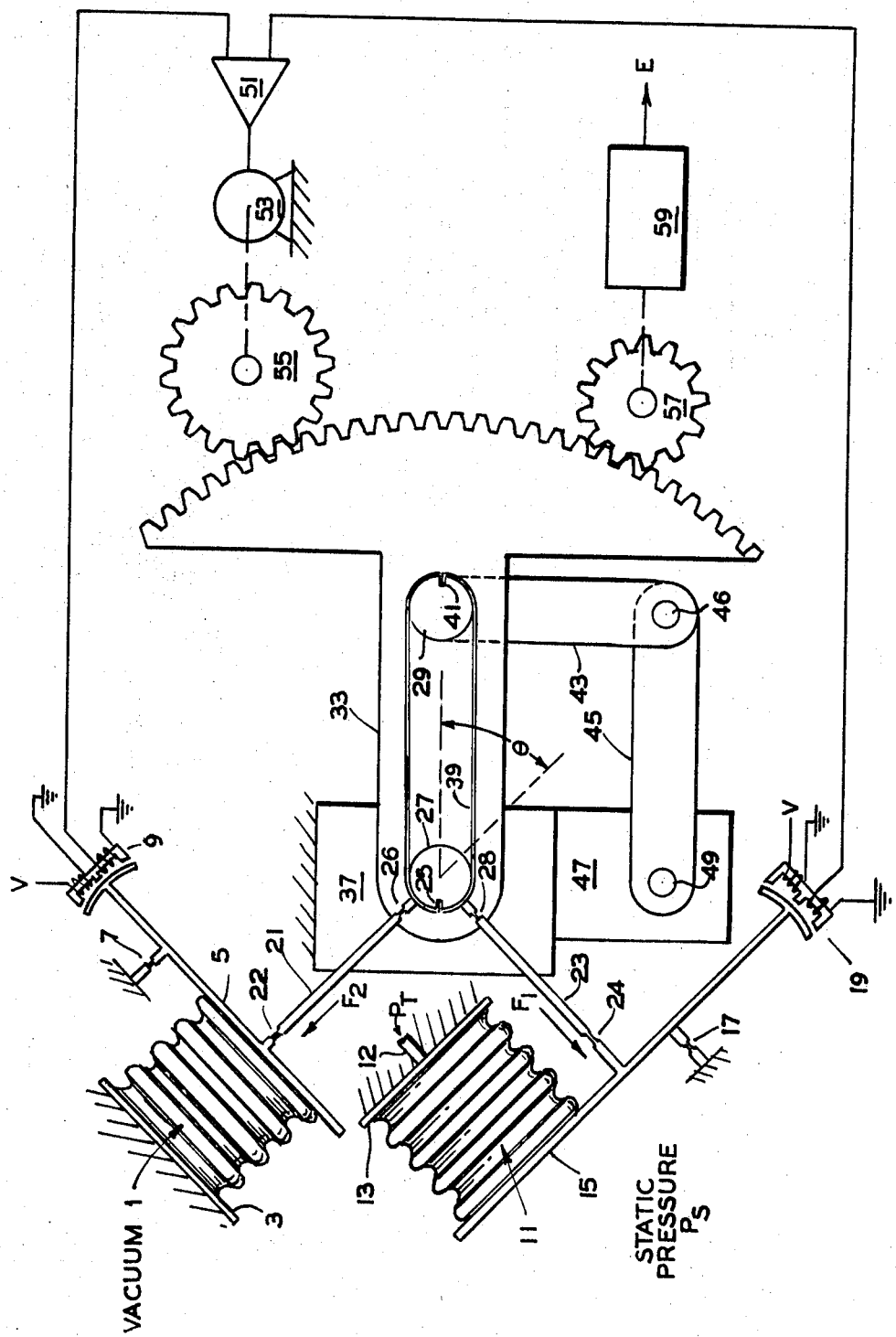
FIG. 1 is a plan view showing a force vector pressure ratio sensing device constructed in accordance with the present invention.

Referring to FIG. 1, there is shown a novel pressure ratio measurement device for providing an output signal E corresponding to the ratio of a first pressure $P_S$ to a difference $Q_C$ between the first pressure $P_S$ and a second pressure $P_T$. The entire device is encapsulated in a chamber subjected to pressure $P_S$. An evacuated bellows 1 is mounted between a fixed surface 3 and one end of a lever arm 5 and exerts a force $F_2$, corresponding to pressure $P_S$, on the lever arm. Lever arm 5 is mounted to pivot about a flex pivot 7 and has an opposite end connected to an E pick off 9. A bellows 11 is mounted between a fixed surface 13, preferably positioned at a right angle to surface 3, and one end of a lever arm 15. Bellows 11 has a pressure $P_T$ supplied therein by a conduit 12 and exerts a force $F_1$, corresponding to pressure $Q_C$, on lever arm 15. Lever arm 15 is mounted to pivot about a flex pivot 17 and has an opposite end connected to an E pick off 19. A pair of connecting links 21 and 23 are pivotally connected at one end to lever arms 5 and 15 by flex pivots 22 and 24, respectively, and have opposite ends connected at right angles to a pulley 27 by flex pivots 26 and 28 as shown in FIG. 2.

Figure 2:
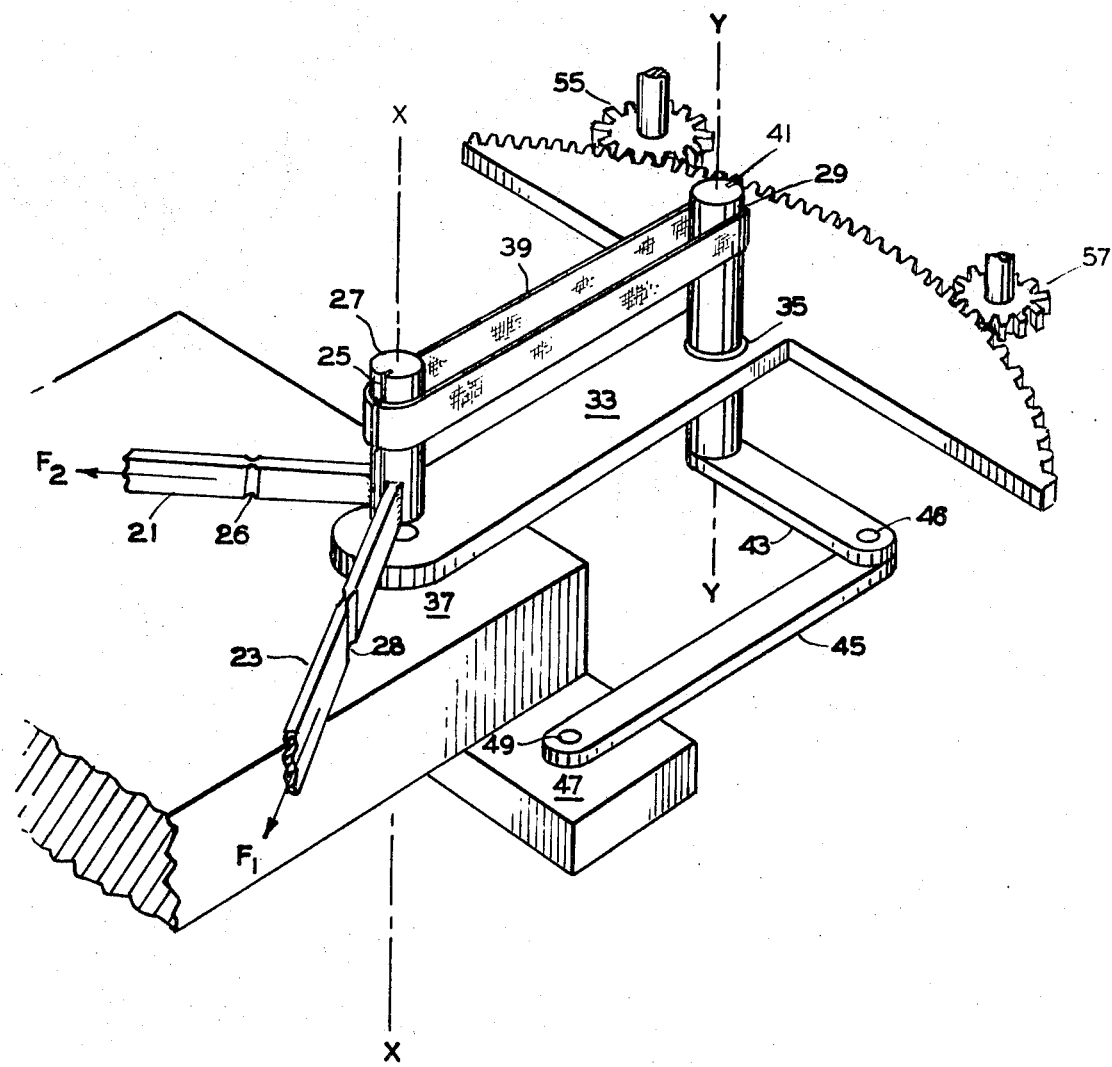
FIG. 2 is a detailed isometric view of a portion of the device shown in FIG. 1.

Referring to FIGS. 1 and 2, a pulley 29, having an axis Y—Y, is journaled in a carriage 33 by a bearing 35. The carriage 33 is pivotally mounted to a fixed surface 37 for pivoting about an axis X—X. Pulley 27 has an axis that is normally coincident with axis X—X.

A belt 39 connects pulleys 27 and 29 and is attached to the pulleys by clamps 25 and 41 to prevent slippage. Pulley 29 is affixed to a linkage member 43 which is pivotally attached to a linkage member 45 at a point 46. Linkage member 45 is pivotally attached at a point 49 on a fixed surface 47 which is parallel to surface 37. The distance between point 49 and point 46 must equal the distance from axis X—X to axis Y—Y. The distance from axis Y—Y to point 46 must equal the distance from axis X—X to point 49. Thus a parallelogram may be formed by lines drawn between axis X—X, axis Y—Y, point 49 and point 46. Linkage members 43 and 45 exactly program the rotation of pulley 29 relative to carriage 33 and maintain a zero rotation of pulley 29 about axis Y—Y.

E pick offs 9 and 19 have outputs connected to summing inputs of a servo amplifier 51 and supply signals thereto corresponding to the displacement of pulley 27. Amplifier 51 sums the pick off signals and provides an output signal to a motor 53. Motor 53 in response to the output signal pivots carriage 33 about axis X—X through a gear 55. A signal source 59 such as a synchro or a potentiometer is connected to carriage 33 through a gear 57 and provides a signal E corresponding to the angular position of carriage 33.

In operation the forces $F_1$ and $F_2$ are transmitted by connecting links 21 and 23 to pulley 27 which is free to pivot about axis Y—Y of pulley 29. The forces $F_1$ and $F_2$ act on pulley 27 to maintain a tension on belt 39 and to align the axes of pulleys 27 and 29 along a resultant force of the forces $F_1$ and $F_2$. Normally pick offs 9 and 19 have a zero output and the device remains stable. When the device is stable carriage 33 is aligned with a line between the axes of pulleys 27 and 29, and with the resultant force. Since links 21 and 23 are at right angles the ratio $F_1/F_2$ is equal to the tangent of an angle $\theta$ between connecting link 21 and the resultant force. When the device is stable link 21 is always in the same position and the carriage is aligned with the resultant force thus the angular position of the carriage corresponds to the angle $\theta$ and the output of signal source 59 corresponds to the ratio $F_1/F_2$.

A change in either pressure $P_T$ or $P_S$ changes the angle of the resultant force causing pulley 27 to pivot about axis Y—Y until the line between axis Y—Y and the axis of pulley 27 is aligned with the resultant force. The axis of pulley 27 is then no longer coincident with axis X—X and the displacement of pulley 27 is sensed by pick offs 9 and 19 which provide signals to amplifier 51. Amplifier 51 in response to the signals causes carriage 33 to pivot about axis X—X until the axis of pulley 27 is coincident with axis X—X and the device is stable at which time signal E corresponds to a new pressure ratio.

As the resultant force approaches alignment with a connecting link 21 or 23 the displacement of the associated lever arm 5 or 15 diminishes for a corresponding pressure ratio change resulting in reduced sensitivity of the associated pick off 9 or 19; however, displacement of the opposite lever arm increases a corresponding amount resulting in an enhancement of the sensitivity of its associated pick off. Summation of the pick off signals results in substantially constant sensitivity throughout the useful range of the device.

Friction free displacement of pulley 27 is provided by the extensive use of flex pivots in combination with the belt and pulley arrangement. However, bearing 35 is subjected to a high loading factor which results in considerable friction; however, the relative rotation between pulley 29 and carriage 33 is exactly programmed by linkage members 43 and 45 and is thus not effected by bearing friction which is overcome by motor 53.

Thus, a device constructed in accordance with the present invention has substantially constant sensitivity over the entire range and is free from inaccuracies caused by bearing friction.

What is claimed is:

1. A force ratio sensor for providing a signal corresponding to the ratio of two forces, comprising:
 a first member adapted to pivot about a first fixed axis;
 a second member comprising a first pulley having a movable axis normally coincident with the axis of the first member;
 means including flexible linkages for applying the forces at an angle to one another to the second member;
 flexible means connecting the first and second members and providing for friction free movement of the second member relative to the first member in response to variation of the forces to provide for movement of the axis of the second member out of coincidence with the axis of the first member, the flexible means including a second pulley having a diameter equal to that of the first pulley and having an axis parallel to the fixed axis and at a fixed distance therefrom, the second pulley being mounted on the first member for rotation relative thereto, a belt like member connecting the first and second pulleys, and means for preventing rotation of the second pulley about its axis;
 displacement sensing means connected to the second member to produce an output signal when the axis of the second member moves out of coincidence with the axis of the first member;
 means connected to the last named means operable in accordance with the output signal therefrom to pivot said first member about its axis in a first or second direction depending upon the characteristics of the output signal to exert an opposing force on the second member through the flexible means to reestablish coincidence of the axes of the first and second members; and
 means connected to the first member to provide a signal corresponding to the ratio of the two forces.

2. A sensor as described in claim 1, in which the means for preventing rotation of the second pulley comprises:
 a first arm adapted to pivot about a fixed axis parallel to the axis of the first member; and
 a second arm fixedly attached to the second pulley and connected to the first arm to pivot about an axis at a point on the first arm, the point being located so that a parallelogram may be formed having corners on the fixed axis of the first arm, the pivotal axis of the second arm, the axis of the second pulley and the fixed axis of the first member.

3. A sensor as described in claim 1, in which the displacement sensing means includes:
 signal means;
 linkage means;
 flex pivots connecting the linkage means between the signal means and the second member, whereby displacement of the second member is transmitted to the signal means which is responsive thereto for providing the output signal corresponding to the displacement of the second member.

4. A sensor as described in claim 1, wherein the last named means comprises signal means connected to the first member responsive to the angular position thereof for providing an electrical signal corresponding thereto.

5. A sensor as described in claim 1, adapted for providing a signal corresponding to the ratio of a first pressure to the difference between the first pressure and a second pressure, additionally comprising:

means for sensing the first pressure and providing the first force corresponding thereto; and means for sensing the difference between the first and second pressures and providing the second force corresponding thereto.

6. A force ratio sensor for providing a signal corresponding to the ratio of two forces, comprising:

a first member adapted to pivot about a first axis;

a second member pivotally mounted on the first member to pivot about a second axis that is parallel to the first axis and at a specified distance therefrom;

means including flexible linkages for applying the two forces to the second member in directions forming a plane perpendicular to the first axis and intersecting at a point on a movable axis that is normally coincident with the first axis, whereby the second member is placed under tension and is displaced about the second axis by variation of the forces;

means for sensing a first component of the displacement of the movable axis and providing a signal corresponding thereto;

means for sensing a second component of the displacement perpendicular to the first component and providing a signal corresponding thereto; and servo means connected to the last two mentioned means and responsive to the signals therefrom for pivoting the first member about its axis until the movable axis of the second member is coincident with the first axis and the angular position of the first member corresponds to the ratio of the two forces.

7. A force ratio sensor for providing a signal corresponding to the ratio of two forces, comprising:

a first member adapted to pivot about a first fixed axis;

a second member having a movable axis normally coincident with the axis of the first member;

means including flexible linkages for applying the forces at an angle to one another to the second member;

flexible means of fixed length connecting the first and second members and providing for friction free movement of the second member relative to the first member in response to variation of the forces to provide for movement of the axis of the second member out of coincidence with the axis of the first member;

displacement sensing means connected to the second member to produce an output signal when the axis of the second member moves out of coincidence with the axis of the first member, the displacement sensing means comprising first means for sensing a first component of the displacement and providing a signal corresponding thereto; second means for sensing a second component of the displacement perpendicular to the first component and providing a signal corresponding thereto; and summing means connected to the last two mentioned means and responsive to the signals therefrom for summing the two signals and providing the output signal;

means connected to the last named means operable in accordance with the output signal therefrom to pivot said first member about its axis in a first or second direction depending upon the characteristics of the output signal to exert an opposing force on the second member through the flexible means to reestablish coincidence of the axes of the first and second members; and means connected to the first member to provide a signal corresponding to the ratio of the two forces.

References Cited

UNITED STATES PATENTS

| 3,282,110 | 11/1966 | Weir | 73—398 |
| 3,299,701 | 1/1967 | Scarlett | 73—407X |

DONALD O. WOODIEL, Primary Examiner

U.S. Cl. X.R.

73—398